United States Patent
Bittner

(10) Patent No.: US 7,413,649 B2
(45) Date of Patent: Aug. 19, 2008

(54) TREATMENT APPARATUS WITH MODULAR CHEMICAL CONTAINING UNITS HAVING ONE-WAY VALVE ASSEMBLIES

(76) Inventor: Gene Bittner, 7762 Holiday Dr., Sarasota, FL (US) 34231

( * ) Notice: Subject to any disclaimer, the term of this patent is extended or adjusted under 35 U.S.C. 154(b) by 404 days.

(21) Appl. No.: 11/192,376

(22) Filed: Jul. 29, 2005

(65) Prior Publication Data

US 2007/0023341 A1    Feb. 1, 2007

(51) Int. Cl.
*B01D 24/46* (2006.01)
(52) U.S. Cl. ............. 210/108; 210/130; 210/136; 210/139; 210/201; 210/232; 210/274; 210/275; 210/284; 210/288; 210/335; 210/411; 210/430; 210/439; 210/440
(58) Field of Classification Search ............ 210/190, 210/284, 288, 279, 117, 108, 124, 130, 136, 210/139, 201, 232, 274, 275, 335, 411, 430, 210/439, 440; 137/12, 136, 269, 271
See application file for complete search history.

(56) References Cited

U.S. PATENT DOCUMENTS

| | | | |
|---|---|---|---|
| 2,300,014 | A | 10/1942 | Saussure |
| 3,319,791 | A | 5/1967 | Horne |
| 3,554,377 | A | 1/1971 | Miller |
| 3,662,780 | A | 5/1972 | Marsh |
| 4,181,605 | A * | 1/1980 | Braswell ............ 210/673 |
| 4,411,779 | A | 10/1983 | McConnell, III |
| 4,416,773 | A * | 11/1983 | Davis et al. ............ 210/289 |
| 4,515,692 | A | 5/1985 | Chandler et al. |
| 4,795,563 | A * | 1/1989 | Auchincloss ............ 210/662 |
| 4,881,313 | A * | 11/1989 | Artinyan et al. ............ 29/896.62 |
| 4,906,381 | A * | 3/1990 | Barbaro ............ 210/660 |
| 5,024,762 | A | 6/1991 | Ford et al. |
| 5,045,189 | A | 9/1991 | Van der Vos et al. |
| 5,112,503 | A * | 5/1992 | Raifman ............ 210/777 |
| 5,116,491 | A | 5/1992 | Brane et al. |
| 5,205,932 | A | 4/1993 | Solomon et al. |
| 5,378,370 | A | 1/1995 | Brane et al. |
| 5,554,283 | A | 9/1996 | Brinda et al. |
| 5,827,427 | A | 10/1998 | Hansen |
| 6,090,285 | A * | 7/2000 | Chau ............ 210/284 |
| 6,254,772 | B1 | 7/2001 | Chau |
| 6,318,563 | B1 | 11/2001 | Drori |
| 6,398,954 | B2 | 6/2002 | Chau |
| 6,610,199 | B2 | 8/2003 | Bittner |
| 2001/0008218 | A1 | 7/2001 | Chau |
| 2004/0144727 | A1 | 7/2004 | McCoy |

OTHER PUBLICATIONS

Merriam-Webster Dictionary, 10th ed. (online edition).*

* cited by examiner

*Primary Examiner*—Matthew O. Savage
*Assistant Examiner*—Lucas Stelling
(74) *Attorney, Agent, or Firm*—Berenato, White & Stavish

(57) ABSTRACT

A fluid treatment system that includes at least one treatment module ("pod") with rigid and impermeable inner and outer surfaces, and an annular center passage which is designed to provide an alternative flow path during the pod backwashing process. At least one chemical treatment media disposed in the interior portion of the pod. A riser extends upwardly through the pod so that the outer surface of the riser and the inner surface of the pod define the annular passage. At least one valve assembly controls the movement of a fluid within the annular passage. The pod is serviced by directing the fluid into the riser and then directing the fluid through the pod, a portion of the fluid flowing through the annular passage.

18 Claims, 7 Drawing Sheets

TREATMENT APPARATUS WITH MODULAR CHEMICAL CONTAINING UNITS HAVING ONE-WAY VALVE ASSEMBLIES

BACKGROUND OF THE INVENTION

1. Field of the Invention

The present invention relates to fluid treatment apparatuses, and more particularly to a modular fluid treatment apparatus in which fluid is directed through a treatment media contained in at least one treatment module as a means of purifying the fluid.

2. Description of the Prior Art

The fluid treatment process involves removing a variety of undesirable contaminants from a fluid source. The removal of each of the contaminants may require a different process, including both mechanical and chemical filters. Prior art fluid filtering systems have addressed the problem of multiple and different fluid contaminants in a variety of ways.

The most basic system involves simply depositing different types of purifying media in a single containment tank, and then directing fluid through the tank. The "media" may include any physical material used in standard fluid treatment practice, including, but not limited to, cation exchange resins, carbons, filter sands, deionization resins, catalysts, ph adjusters, and the like. While this type of treatment is relatively simple to perform, the media generally do not form a homogenous mix so that all the fluid directed through the tank may not be uniformly exposed to each type of media within the tank. Fluid within the tank frequently forms channels around the densest media so that the fluid produced from the process is not consistently treated and consequently may still retain undesirable contaminants.

If the various treatment media in the fluid treatment containment tank are thoroughly mixed, the individual media may break down or become diluted and ineffective. Additionally, removing some specific types of contaminants requires a specific treatment sequence, which is not possible in a single open-tank type system. Further, in a treatment system with mixed media, it is essentially impossible to effectively remove and replace only one type of media, without also replacing all the media.

To ensure that all the water is consistently treated and the treatment media is not diluted or destroyed, multi-tank systems have been developed that have an individual tank dedicated to each type of media, so that the fluid is directed through a series of sequential treatment tanks. While this type of treatment system is, in some ways, ideal, it also relatively expensive and requires a significant amount of space and resources to construct. Further, a multi-tank system includes a network of valves, piping, and tanks that must be periodically cleaned and maintained. As a result of these and other limitations, multi-tank systems are generally practical for only high-volume users with significant resources.

Treatment system manufacturers have attempted to address these concerns by designing systems for relatively low volume users that have a single tank, but also include multiple individual layers of media arranged within the tank so that fluid flows sequentially through each layer. While these types of systems are an improvement over previous systems, the layered systems are still relatively inflexible. The different types of filter media comprising the layering system are consumed by the filtration process at differing rates. To remove and service a specific target layer, the layers above the target layer must be individually removed from the tank, and then reinstalled after the target layer has been serviced and prior to re-starting operation.

Alternatively, the entire layered system can be serviced at once by "backwashing" the system, however, because all of the fluid injected into the system must pass through all of the media layers before the fluid can be extracted, sediment removed from the lower layers is frequently re-deposited in the system's upper layers before the fluid flows out of the treatment device. Additionally, conventional layered systems do not give the user the option of adding or extracting fluid between the treatment layers.

The need exists for a fluid treatment system that enables an operator to service or individually remove a filter media module without affecting or removing the other filter media in the system. The need also exists for a system that allows a user to add or remove fluid during the treatment process and provides a more effective means of servicing the system. The current invention is a stand-alone modular water treatment system that allows individual pod-type modules to be removed and replaced with minimal disassembly of other pods in the system. The system is extremely flexible and may contain as few as one pod, or multiple pods. The system also allows a user to blend or remove fluid between the treatment pods, and is configured to allow user to service the system to more effectively remove sediment built up in the treatment media.

SUMMARY OF THE INVENTION

The current invention is a fluid treatment system that comprises at least one treatment module ("pod") that has rigid and impermeable inner and outer walls and includes a fluid inlet side and a fluid outlet side. The pod inner wall defines an opening that extends through the interior portion of the pod. At least one chemical treatment media is disposed in the interior portion of the pod. A fluid path extends through the fluid inlet side to the interior portion of the pod, and then through the fluid outlet side. A riser extends through the pod opening. The riser has a smaller outer diameter than the diameter of the opening, so that an annular passage between the pod and the riser is thereby defined. At least one valve assembly controls the movement of a fluid within the annular passage. The pod is serviced by directing the fluid into the riser and then directing the fluid through the pod, a portion of the fluid flowing through the annular passage.

DETAILED DESCRIPTION OF PREFERRED EMBODIMENTS

Figure 1:
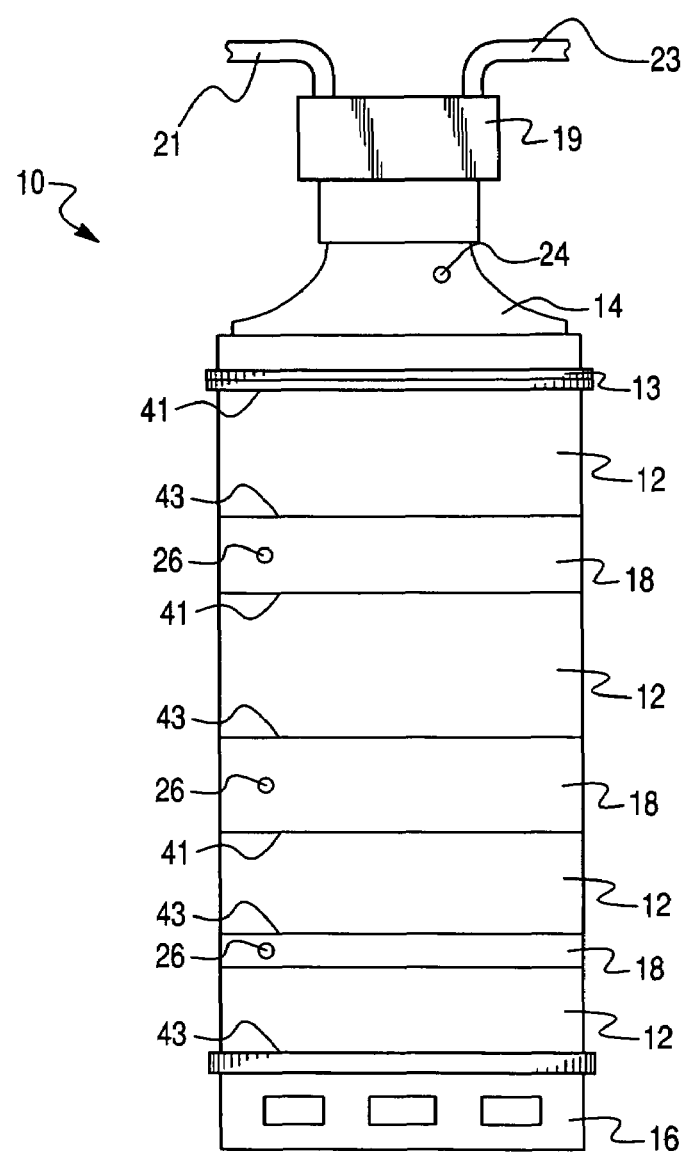
FIG. 1 is a perspective of the treatment system of the present invention.

As best shown in FIG. 1, the current invention is a stand-alone water treatment device 10. The device 10 is comprised of at least one individual treatment tank or "pod" 12 disposed between a head unit 14 and a base unit 16. FIG. 1 shows a treatment device 10 having three pods 12, however, the device 10 may include more than three or fewer than three pods 12, as required for a specific treatment application. The pods 12 are vertically aligned and self-supporting, which means that the pods require no auxiliary support to remain in an upright vertical position. The head unit 14 is connected to a top portion of the uppermost pod 12, and the base unit 16 is connected to a bottom portion of the lowest pod 12. Union collars 18 connect each pod 12 to the next sequential pod 12. A control valve arrangement 19 controls the flow of fluid into the device 10 through a fluid inlet line 21, and also controls the flow of the fluid out of the device 10 through the fluid outlet line 23.

Figure 2:
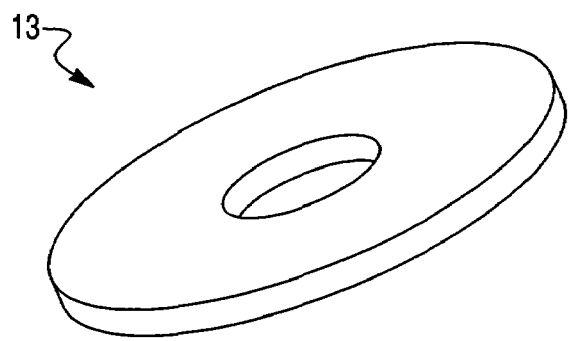
FIG. 2 is an isometric view of a wafer disk.

As best shown in FIGS. 1 and 2, an optional wafer disk 13 may be positioned above the first pod 12 to provide basic mechanical filtration. In a device 10 comprising only one pod 12, the filtration provided by the wafer disk 13 is of particular importance.

Figure 3:
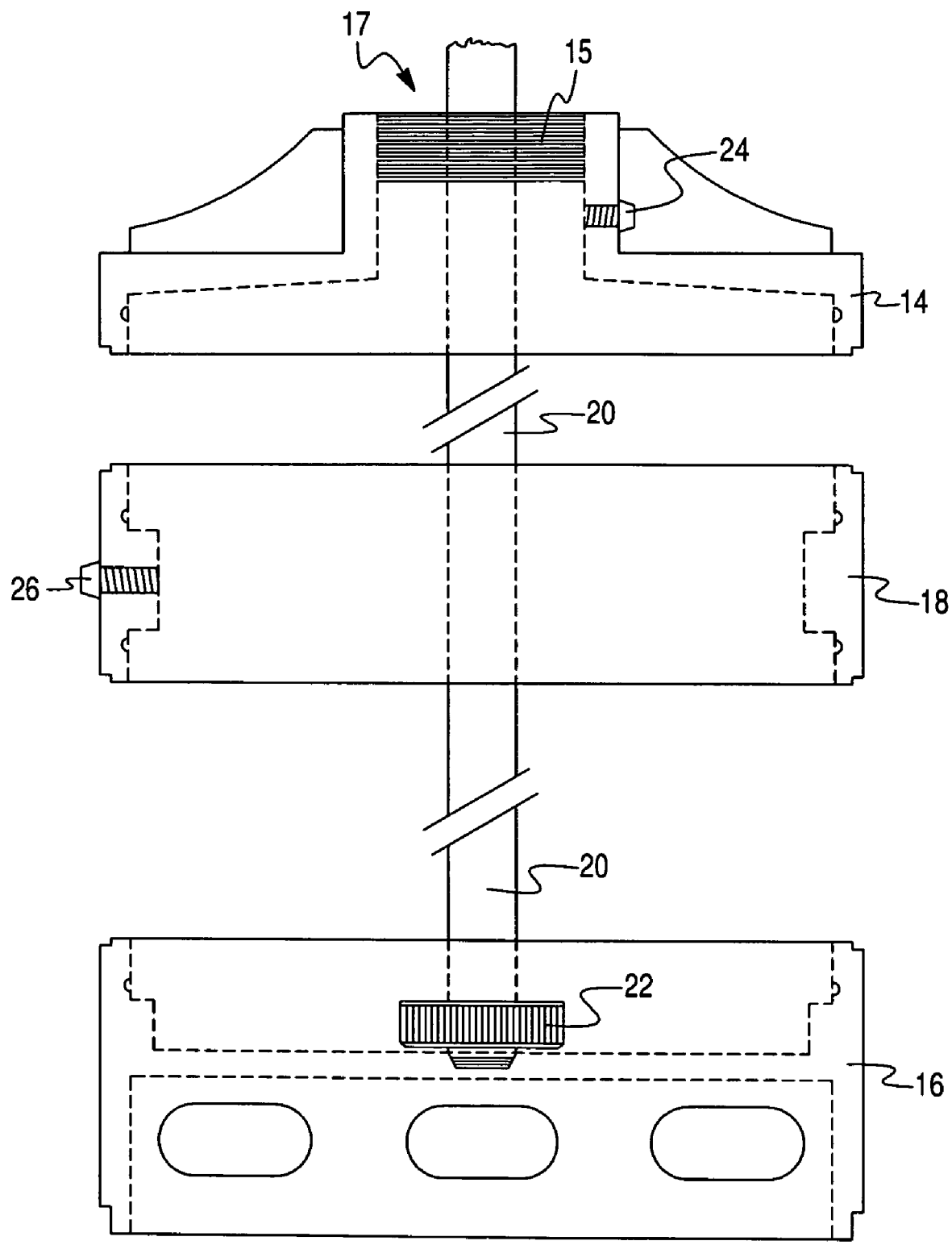
FIG. 3 is an exploded sectional view of the treatment system union collar, base unit, and head unit.

As best shown in FIG. 3, a riser 20 extends from the base unit 16 through the head unit 14 and out an opening 17 in the top of the head unit 14. In the preferred embodiment, the riser tube 20 is screwed into the base unit 16 for easy replacement when adding the pods 12, although any connection means should be considered within the scope of the invention. In the basic fluid treatment sequence, treated fluid enters the riser 20 through a perforated assembly 22 at the base of the riser 20, and is extracted from the riser, as directed by the control valve arrangement 19 (shown in FIG. 1) at the top of the device 10.

As best shown in FIGS. 1 and 3, the head unit 14 is an essentially a hollow housing that allows untreated fluid from the fluid inlet line 21 to be sprayed across the surface of the first pod 12 or the wafer disk 13. The head unit 14 also includes a connecting surface 15 for attaching the control valve arrangement 19, and an opening 17 that accommodates at least the riser 20, the inlet line 21, and the outlet line 23 (shown in FIG. 1). The head unit 14 also has a compressed air inlet tap 24 that may be used in servicing the pod 12.

As further shown in FIGS. 1 and 3, the union collar 18 is essentially a hollow tank that provides an intern pooling area for partially treated fluids. Fluids are allowed to pool in the union collar(s) between the various treatment pods 12. The union collar 18 includes at least one blending port 26. The blending port 26 enables an operator to add or remove a fluid at a specific phase in the treatment process. This option allows the operator to further customize the treatment of a particular fluid. For example, the chlorine from a municipal water supply may be removed by a previous pod 12 in the treatment device 10, however, an operator may wish to blend a predetermined amount of chlorine (for example 10%) back into the treated water to attain a low level anti-bacterial effect. To create the desired blend, chlorinated water may be blended back into the treatment process through a union collar blending port 26. Through this process, the union collar 18 and associated blending port 26 significantly increase the flexibility of the treatment process of the current invention.

The base unit 16 provides a stable support for the treatment device 10. In the preferred embodiment, the base unit 16 comprises an essentially convex sump that can be easily removed and cleaned by an operator with minimal disturbance of the other components. Fluid is removed from the device 10 by extracting the fluid from the base unit 16, through the perforated assembly 22, and then into the riser 20, and out the fluid outlet line 23, as directed by the control valve arrangement 19.

Figure 4:
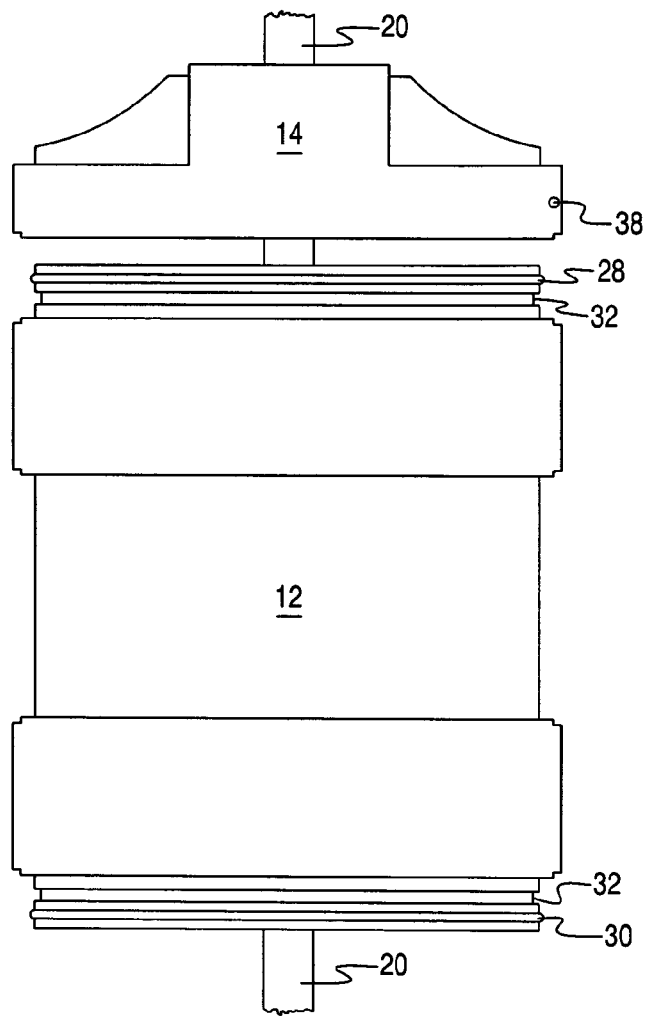
FIG. 4 is an exploded view of a pod connected to a head unit.
Figure 5:
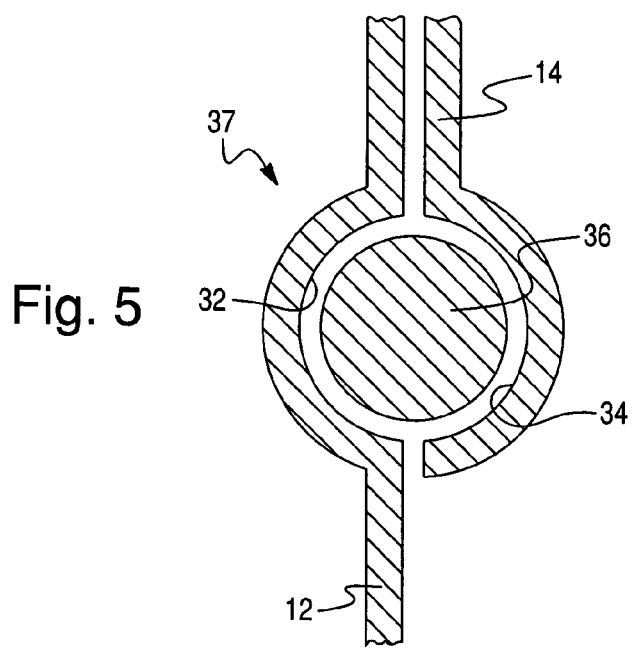
FIG. 5 is a sectional view of a connection between a head unit and a pod.

FIGS. 4 and 5 show an exemplary means of connecting the head unit 14 and the first pod 12. In the preferred embodiment, the connecting means associated with each of the respective pods 12, union collars 18, and the base unit 16 are essentially identical to the connecting means shown in FIGS. 4 and 5. The connection apparatus includes upper 28 and lower 30 O-rings to ensure a fluid-tight seal between each of the pods 12 and the associated components. A retention groove 32 is formed in the outwardly facing lip of the upper portion of the pod 12. A corresponding groove is 34 is formed in the inwardly facing lip of the union collar 18, head unit 14, or the base unit 16. When the head unit 14 is seated on the pod 12, the outwardly facing groove 32 of the pod is disposed opposite the inwardly facing groove 34 of the head unit 34. A flexible rod or cable 36 is threaded through an aperture 38 and between the grooves 32, 34, and thereby forms a locking mechanism 37 that ensures that each of the pods 12 is securely connected to the adjoining components.

Although the connecting means of the preferred embodiment is shown in FIGS. 4 and 5 and described above, other types of connecting means should be considered within the scope of the invention. Specifically, any means known in the art may be used to secure each of the respective pods 12 to the head unit 14, the base unit 16 and the union collars 18.

Figure 6:
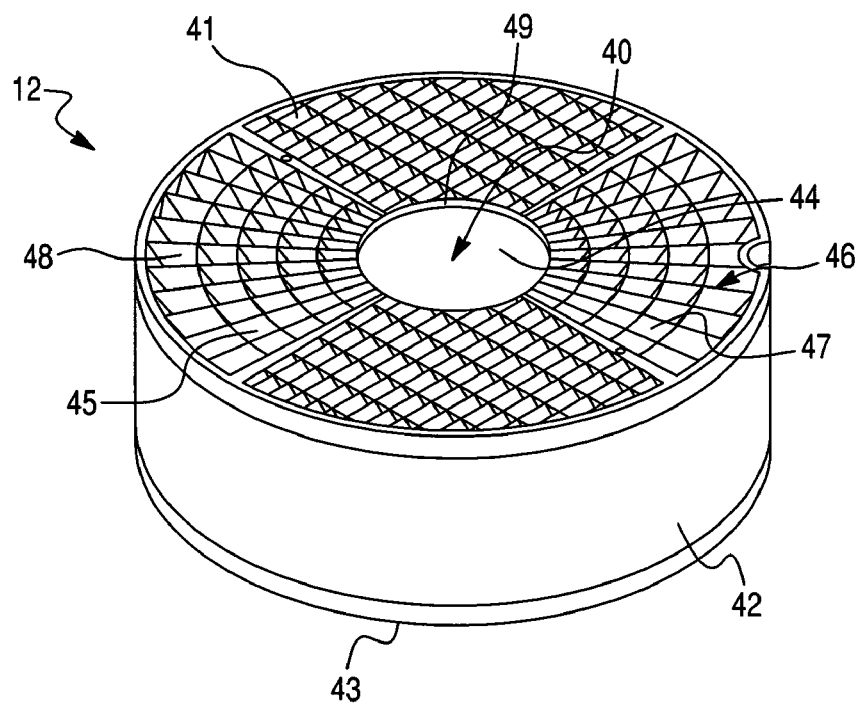
FIG. 6 is an isometric view of a fluid treatment pod.

As best shown in FIG. 6, in the preferred embodiment, the individual pods 12 are circular and have a center opening 40. An outer wall 42 and an inner wall 44 defining the center opening 40 are rigid and impermeable so that the pods 12 maybe stacked vertically with no other exterior means of support required. A directional flow disk 46 ensures the radial flow of the fluid through a plurality of fins 48. In the preferred embodiment, the fins 48 are 0.25 inches wide and are angled at 45 degrees and varying in radial directions. The fins 48 modify the movement of the fluid from a pure axial direction to a combination of axial and radial directions. The directional flow disk 46 also provides a foundation support for the pods and a chemical treatment media 45 within an interior portion 47 of each pod 12. In the preferred embodiment, the media 45 is semi-solid and is maintained within the interior portion 47 of the pod 12 by a containment system that is specific to the type of treatment media within the pod 12.

In an alternative embodiment, the pods 12 may have any shape known in the art, and the directional flow disk 46 may have alternative configurations specific to the treatment media within the pod 12. Further, the pod 12 may be configured so that the treatment media is not semi-solid and may have alternative forms.

Figure 7:
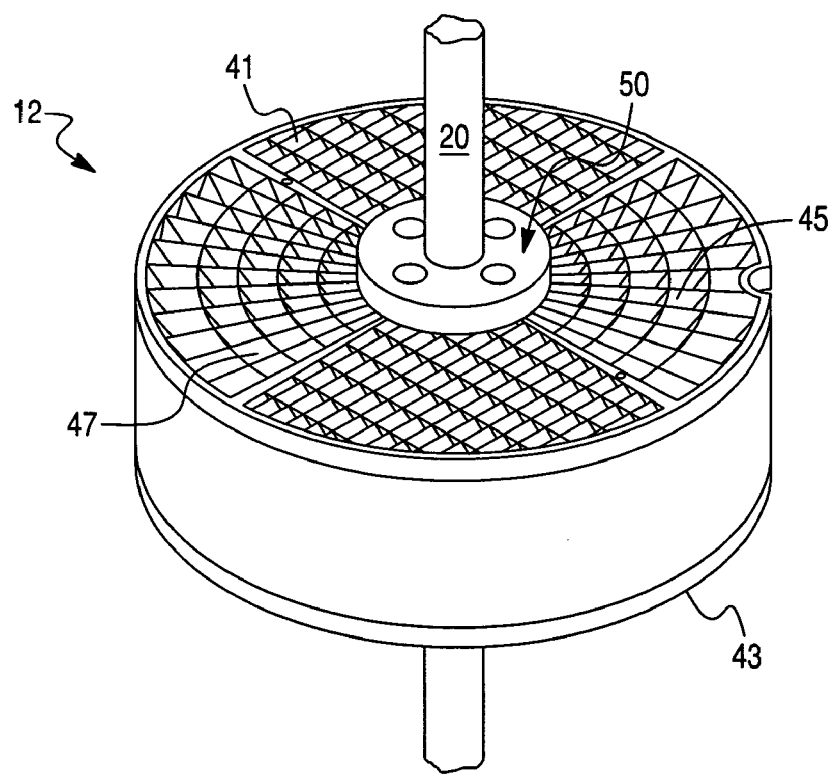
FIG. 7 is an isometric view of a pod with the valve assembly and riser installed.
Figure 8:
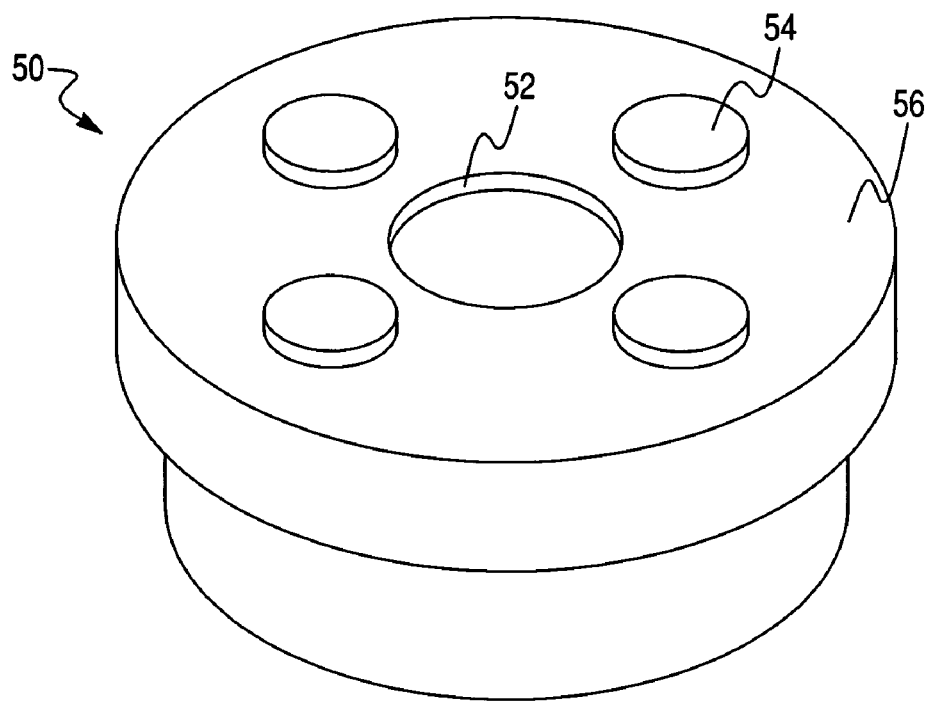
FIG. 8 is an isometric view of the valve assembly.

As best shown in FIGS. 7 and 8, a valve assembly 50 fits within the center opening 40 of the pod 12. In the preferred embodiment, the valve assembly 50 screws into the center opening 40. A valve assembly outer O-ring 49 (shown in FIG. 6) prevents leakage between the valve assembly 50 and the inner wall 44 of the pod. A valve assembly inner O-ring 52 (shown in FIG. 8) prevents leakage between the valve assembly 50 and the riser 20.

Figure 9:
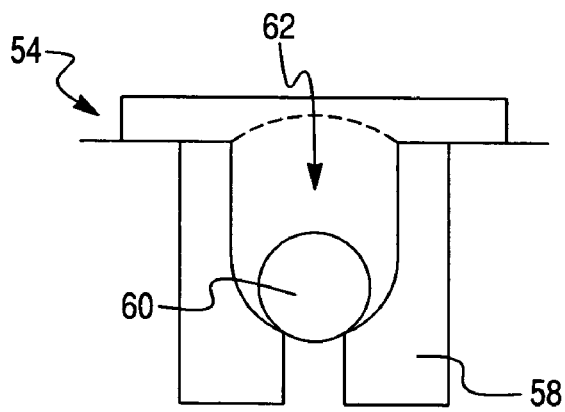
FIG. 9 is a sectional view of an individual valve in the closed position.
Figure 10:
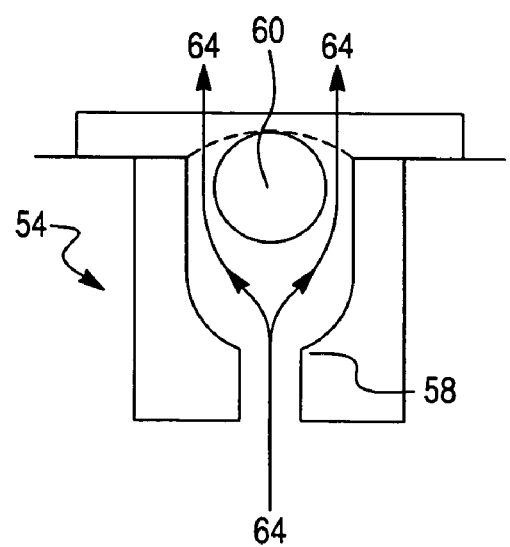
FIG. 10 is a sectional view of an individual valve in the open position.

As best shown in FIGS. 8-10, the valve assembly 50 comprises at least one valve 54 seated in a valve housing 56. In the preferred embodiment, the valve 54 is comprised of a standard one-way ball valve 54 of the type that is well known in the art. As shown in FIGS. 9 and 10, the valve 54 is comprised of a traveling ball 58 and a seat 60. When fluid pressure is applied in the direction of the arrow 62, the ball 58 lodges in the stationary seat 60 so that fluid is not allowed to pass through the valve 54. When fluid pressure is applied in the direction of the arrow 64, the ball 60 is unseated and fluid flows through the valve 54.

Although a standard ball valve 54 is shown in FIGS. 9 and 10, any type of mechanical or electrical valve 54 known in the art may be used. In an alternative embodiment, an electronic solenoid-controlled valve may be used to control the flow of fluid through the valve assembly 50.

Figure 11:
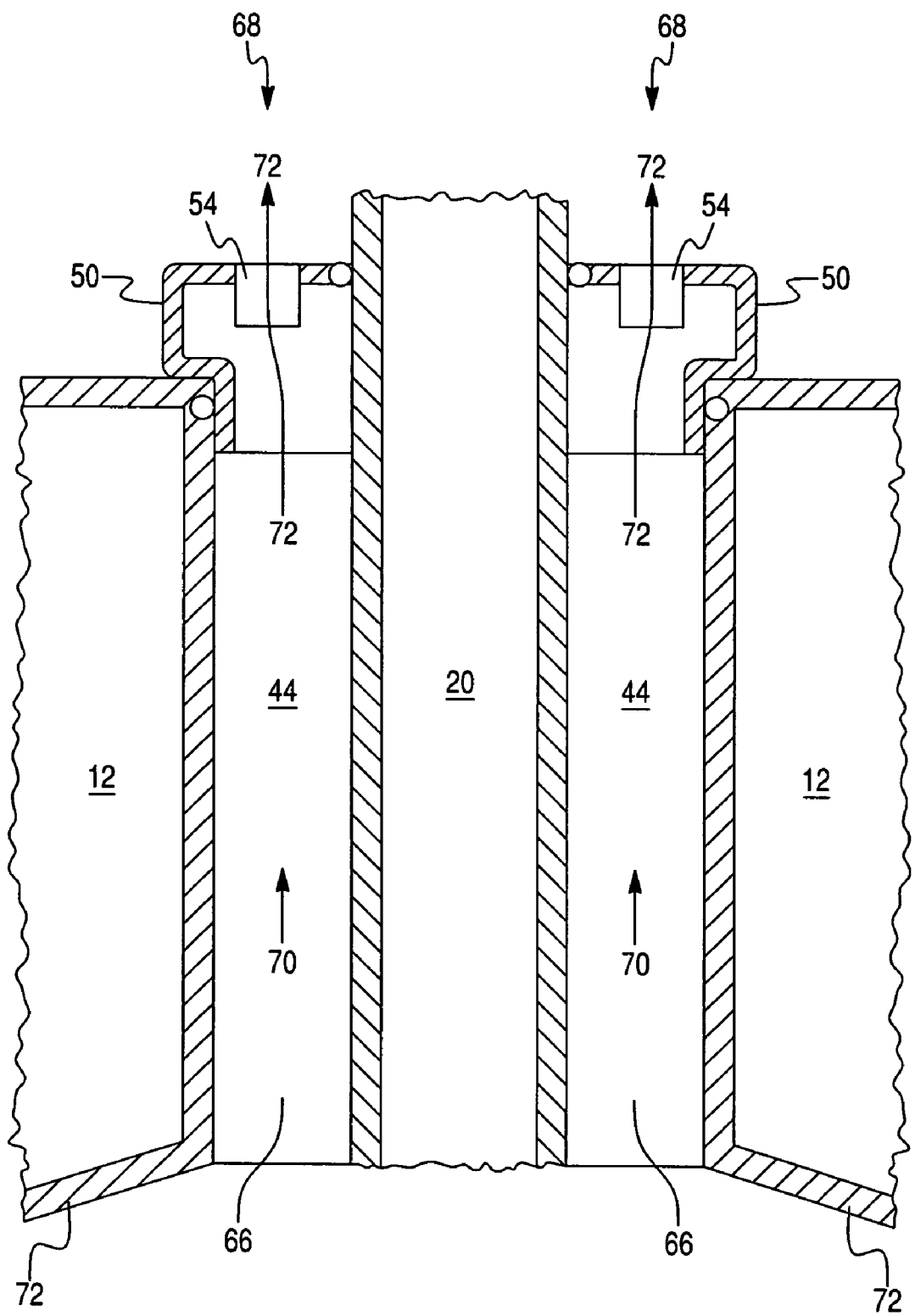
FIG. 11 is a sectional view of the valve assembly installed in a pod.

As best shown in FIG. 11, when the valve assembly 50 is seated in seated in the pod 12, an annular area 66 is created between the outer diameter of the riser 20 and the inner wall 40 of the pod 12. During a typical fluid treatment process, the valves 54 (not shown in detail in FIG. 11) prevent the fluid from moving downwardly though the valve assembly 50 in the direction of the arrow 68 and into the annular area 66. However, the fluid may move upwardly in the direction of the arrow 70 when the pressure applied by the fluid in an upwardly direction 70 is sufficient to unseat the ball 60 from the seat 58, as shown in FIG. 10. In the preferred embodiment, the lower surface 43a of the pod 12 has concave shape that facilitates the movement of fluid into the annular area 66.

A best shown in FIG. 1, in operation, untreated fluid enters the device 10 through the fluid inlet line 21 and is sprayed across the surface of the wafer disk 13 or the first pod 12, as applicable. Through gravitational migration, the fluid flows through the wafer disk 13 and into the first pod 12. The fluid then flows downwardly through the vertically arranged series of pods 12 and universal collars 18 comprising the treatment device 10.

As the fluid flows downwardly, the fluid establishes a flow path through each of the pods 12, whereby the fluid flows through into an inlet side 41 of the pod 12 and engages the chemical media 45 within the pod 12, and then flows through the chemical media 45 and out an outlet side 43 of the pod 12. When the treated fluid reaches the base unit 16, the fluid is drawn into the perforated assembly 22 of the base unit 16 and is extracted upwardly through the riser 20 and out through the fluid outlet 23, as best shown in FIGS. 1 and 3.

The treatment device 10 is serviced by subjecting the components of the device 10 to a modified "backwashing" process. During the modified backwashing process, fluid is injected downwardly through the riser 20. As the fluid injection continues, the fluid rises upwardly and establishes a first general flown path wherein the fluid level moves upwardly through the pods and associated union collars 18 in the reverse order of the treatment process. When the fluid level reaches the head unit 14, the fluid is extracted from the device 10 through the head unit 14, as directed by the valve control arrangement 19.

As best shown in FIG. 11, during the backwashing process, a secondary fluid path 72 in the direction of the arrow 70 is also established. The secondary flow path allows a portion of the backwash fluid to flow through the annular area 66 and out the valve assembly 50 of each pod 12. This secondary fluid path 72 allows a portion of the backwash fluid to avoid the movement upwardly through each of the pods 12, and thereby prevents the repeated filtration of the backwash fluid inherent in the conventional backwash process.

By establishing dual flow paths through the treatment device 10, the media associated with each of the pods 12 is de-compacted and flushed, as is the case with the conventional backwashing process. However, because a significant amount of the backwash fluid is allowed to bypass the pod media through the secondary flow path, less of the sediment is re-deposited in the next sequential pod 12, as the fluid moves upwardly through the device 10. The backwash method of the current invention allows more of the entrained sediment to be removed from the device 10, while simultaneously benefiting from the same de-compaction and flushing benefits realized from the conventional backwashing process.

Figure 12:
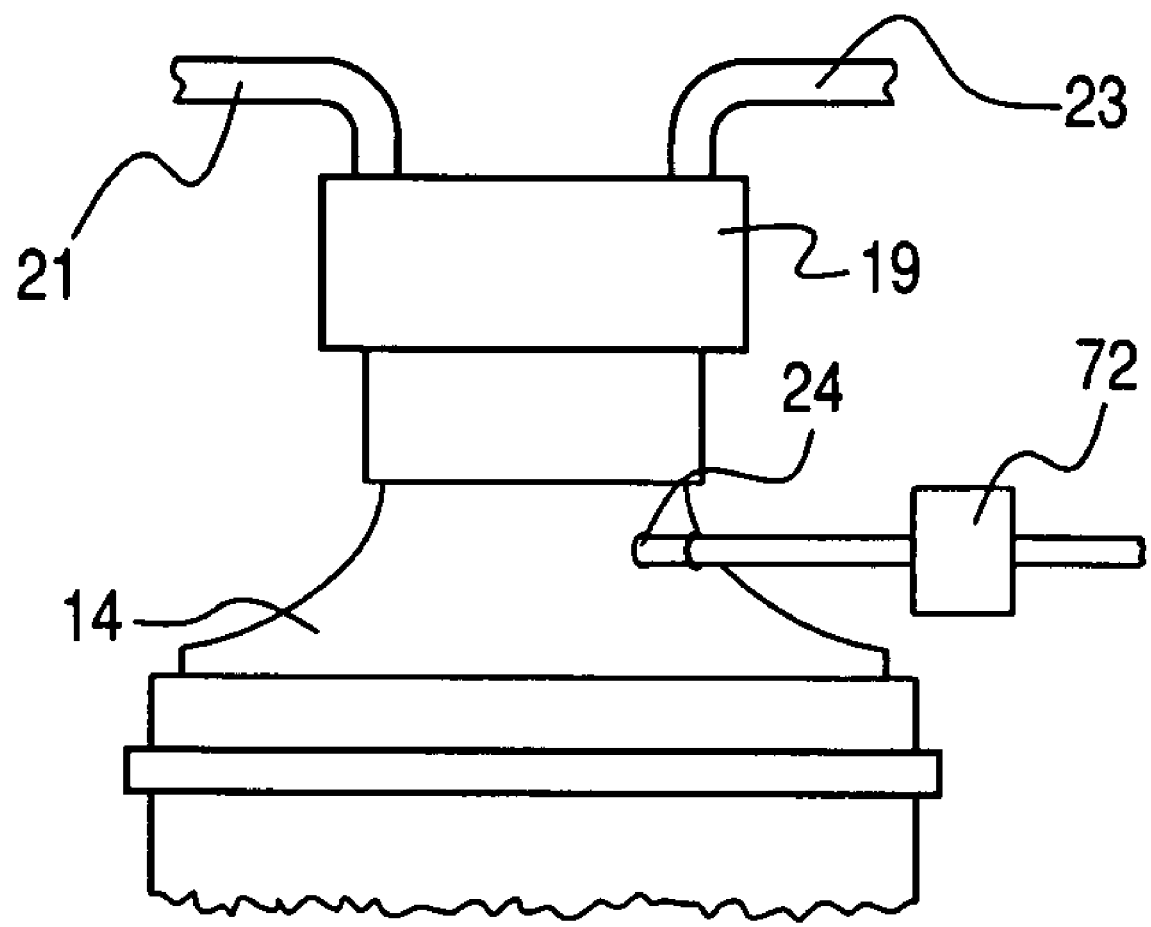
FIG. 12 is a partial perspective view of the upper portion of the treatment device.

The backwashing process described above may be enhanced through the use of compressed air to purge the device 10 prior to the initiation of the backwash process. As best shown in FIG. 12, the device 10 may include a compressed air inlet valve 27 which is connected to the compressed air inlet port 24 (also shown in FIG. 3). Prior to the initiation of the backwash process, compressed air may be injected into the device 10 so that an air cell is created. As more air is injected, the air cell enlarges and migrates downwardly from the top of the device 10, thereby displacing any fluid remaining in the device 10. The valve 27 may include a pressure regulating blow-off function to ensure that the device is not over-pressurized during the air injection process. The air injection process may also be used after the completion of the backwashing process to ensure that backwashing fluid is purged from the device 10 prior to the re-initiation of treatment operations.

The control valve arrangement 19 may contain any configuration of electrical and/or mechanical valves known in the art. In the preferred embodiment, the control valve arrangement 19 comprises electronically controlled automatic valves that include a programmable timer so that the valve arrangement 19 periodically shifts the device from a treatment mode, to a backwash mode, and then back into the treatment mode on an automated basis to ensure optimal performance of the treatment system. In alternative embodiments, the control valve arrangement 19 may be as simple as on/off valves attached to the fluid inlet 21 and fluid outlet 23 lines, or as complex as computer-actuated control mechanisms that interface with sensors monitoring the condition of the various treatment media and adjust the treatment process accordingly.

From the foregoing description it is clear that the current invention is an innovative stand-alone modular water treatment system that allows individual pod-type modules to be removed and replaced with minimal disassembly of other pods in the system. The system is extremely flexible and may contain as few as one pod, or multiple pods. The system also allows a user to blend or remove fluid between the treatment pods. The system further includes a backwashing method that more effectively removes sediment from the treatment pods during the device servicing process.

The description of the preferred embodiments of the present invention has been presented for the purpose of illustration in accordance with the provisions of the Patent Statutes. It is not intended to be exhaustive or to limit the invention to the precise forms disclosed. For example, it is to be understood that while the description of the present invention has included references to water treatment, other types of fluids may also be treated using the described process.

Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A treatment system comprising:
   at least one pod having rigid and impermeable inner and outer walls, a fluid inlet side and a fluid outlet side;
   said inner wall defining an opening extending through an interior portion of said pod;
   at least one chemical treatment media disposed in said interior portion so that a fluid path extends through the fluid inlet side to said interior portion and then through the fluid outlet side;
   a riser extending though said opening, said riser having a smaller outer diameter than a diameter of said opening to thereby define an annular passage between said pod and said riser;
   at least one valve assembly controlling movement of a fluid within said annular passage;
   said at least one pod serviced by directing the fluid into said riser and then directing the fluid through said at least one pod so that a portion of the fluid flowing through said annular passage,
   wherein said valve assembly comprises a valve housing and at least one one-way valve disposed radially between said pod and said riser.

2. The treatment system of claim 1, wherein each said valve assembly comprises said a valve housing and said at least one one-way valve disposed radially between at least two of said pods and said riser.

3. The treatment system of claim 1 wherein said one-way valves allow the fluid to bypass said chemical treatment media when said pod is serviced, but preventing the fluid from bypassing said chemical treatment media during a fluid treatment process.

4. The treatment system of claim 3 wherein said one-way valves are ball-type valves.

5. The treatment system of claim 1 wherein said treatment system comprises a plurality of pods.

6. The treatment system of claim 5 wherein said pods are disposed in a stacked vertical alignment.

7. The treatment system of claim 5 further comprising a hollow union collar disposed between each of said pods in said treatment system.

8. The treatment system of claim 7 wherein said union collar includes a blending port that allows fluid to be added and removed from said treatment system.

9. The treatment system of claim 8 wherein said blending port extends perpendicular to said pod outer surface.

10. The treatment system of claim 5 further comprising a hollow head unit attached to an uppermost one of said pods.

11. The treatment system of claim 10 further comprising a control valve arrangement, said control valve arrangement is attached to said head unit, said control valve arrangement controls the fluid entering and leaving said treatment system.

12. The treatment system of claim 11 wherein said control valve arrangement comprises an electronic programmable timer that automatically begins fluid treatment, stops fluid treatment, and automatically initiates a servicing of said pods, and then re-starts fluid treatment.

13. The treatment system of claim 5 further comprising a base unit, said riser being attached to said base unit, the fluid flowing into said riser through a perforated assembly is operatively associated with said riser.

14. A treatment system comprising:
   at least one pod having rigid and impermeable inner and outer walls, a fluid inlet side and a fluid outlet side;
   said inner wall defining an opening extending through an interior portion of said pod;
   at least one chemical treatment media disposed in said interior portion so that a fluid path extends through the fluid inlet side to said interior portion and then through the fluid outlet side;
   a riser extending through said opening, said riser having a smaller outer diameter than a diameter of said opening to thereby define an annular passage between said pod and said riser;
   at least one valve assembly controlling movement of a fluid within said annular passage;
   said at least one pod serviced by directing the fluid into said riser and then directing the fluid through said at least one pod so that a portion of the fluid flowing through said annular passage,
   a hollow head unit attached to an uppermost one of said pods; and
   a compressed air port formed in said head unit.

15. The treatment system of claim 14 further comprising a compressed air valve connected to said compressed air port, said compressed air valve allows compressed air to be selectively directed into said treatment system, said compressed air valve having a pressure relief means.

16. A treatment system comprising:
   at least one pod having rigid and impermeable inner and outer walls, a fluid inlet side and a fluid outlet side;
   said inner wall defining an opening extending through an interior portion of said pod;
   at least one chemical treatment media disposed in said interior portion so that a fluid path extends through the fluid inlet side to said interior portion and then through the fluid outlet side;
   a riser extending through said opening, said riser having a smaller outer diameter than a diameter of said opening to thereby define an annular passage between said pod and said riser;
   at least one valve assembly controlling movement of a fluid within said annular passage;
   said at least one pod serviced by directing the fluid into said riser and then directing the fluid through said at least one pod so that a portion of the fluid flowing though said annular passage,
   a hollow head unit aft ached to an uppermost one of said pods; and
   a wafer disk, said wafer disk is disposed adjacent said head unit and before a first one of said pods.

17. A The treatment system comprising:
   at least one pod having rigid and impermeable inner and outer walls, a fluid inlet side and a fluid outlet side;
   said inner wall defining an opening extending through an interior portion of said pod;
   at least one chemical treatment media disposed in said interior portion so that a fluid path extends through the fluid inlet side to said interior portion and then through the fluid outlet side;
   a riser extending through said opening, said riser having a smaller outer diameter than a diameter of said opening to thereby define an annular passage between said pod and said riser;
   at least one valve assembly controlling movement of a fluid within said annular passage;
   said at least one pod serviced by directing the fluid into said riser and then directing the fluid through said at least one pod so that a portion of the fluid flowing through said annular passage,
   a hollow head unit attached to an uppermost one of said pods; and wherein a groove in said head unit forms a first half of a connection channel, and a groove in said uppermost one of said pods forms a second half of said connection channel, wherein a flexible member is inserted into an aperture in said head unit so that said flexible member fills said connection channel and thereby locks said head unit to said uppermost one of said pods.

18. A The treatment system comprising:

at least one pod having rigid and impermeable inner and outer walls, a fluid inlet side and a fluid outlet side;

said inner wall defining an opening extending through an interior portion of said pod;

at least one chemical treatment media disposed in said interior portion so that a fluid path extends through the fluid inlet side to said interior portion and then through the fluid outlet side;

a riser extending through said opening, said riser having a smaller outer diameter than a diameter of said opening to thereby define an annular passage between said pod and said riser;

at least one valve assembly controlling movement of a fluid within said annular passage;

said at least one pod serviced by directing the fluid into said riser and then directing the fluid through said at least one pod so that a portion of the fluid flowing though said annular passage, wherein a first side of said pod has a concave shape so that fluid is directed into said annular area, and wherein particulate released from a lower pod and subsequently blocked by an upper pod in backwash will channel along a concave radius to the annular channel toward a center of the tank.

* * * * *